UNITED STATES PATENT OFFICE.

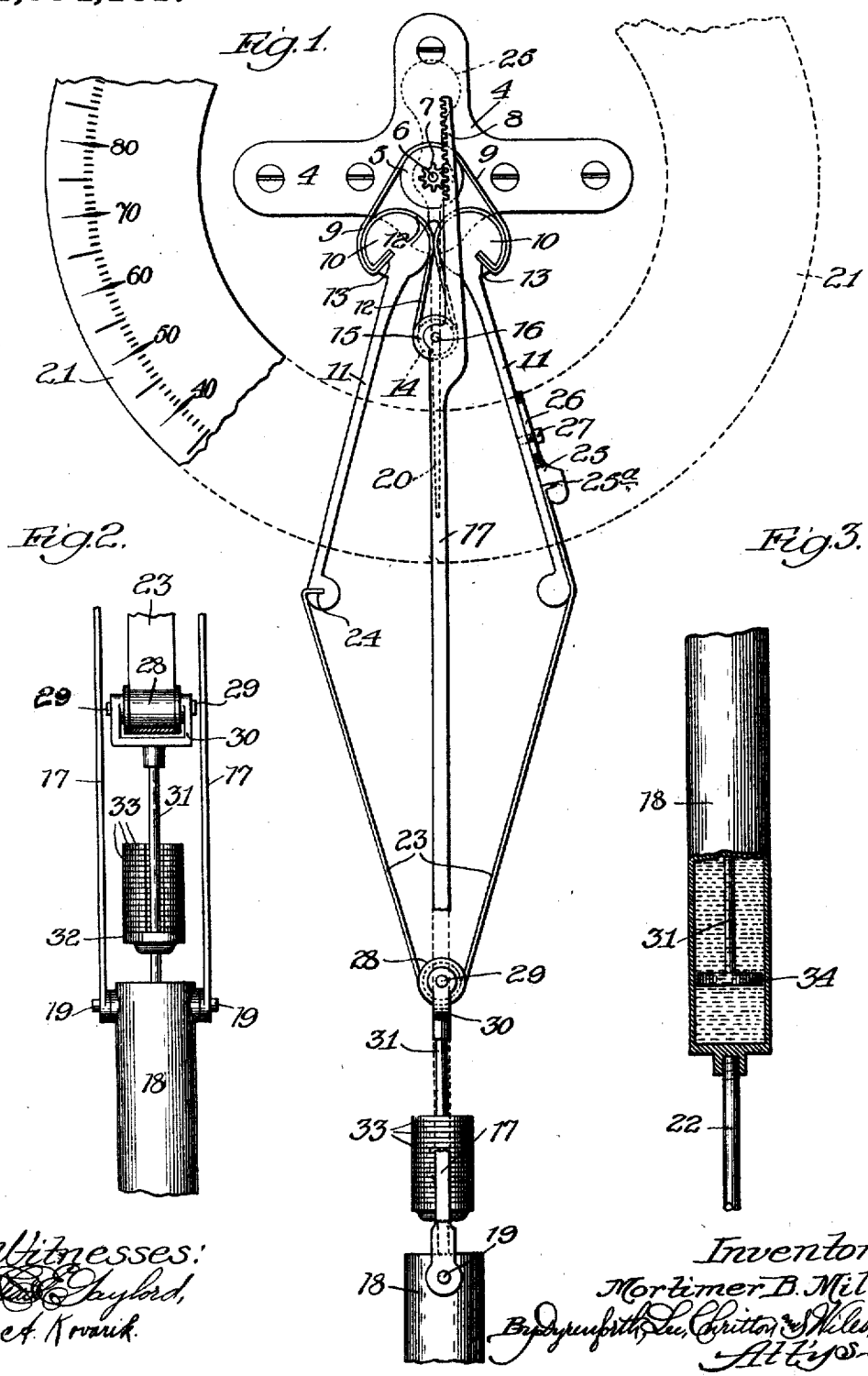

MORTIMER B. MILLS, OF CHICAGO, ILLINOIS, ASSIGNOR TO HERBERT S. MILLS, OF CHICAGO, ILLINOIS.

WEIGHING MECHANISM.

1,334,161.  Specification of Letters Patent.  Patented Mar. 16, 1920.

Application filed April 14, 1919. Serial No. 289,930.

*To all whom it may concern:*

Be it known that I, MORTIMER B. MILLS, a citizen of the United States, residing at Chicago, in the county of Cook and State of Illinois, have invented a new and useful Improvement in Weighing Mechanism, of which the following is a specification.

My primary object is to provide a novel, relatively simple, and positively operating scale mechanism, which will present the minimum friction of the operating parts and operate to indicate accurately the weight of the object placed on the scale.

Referring to the accompanying drawings, Figure 1 is a view in front elevation of scale mechanism constructed in accordance with my invention, certain parts illustrated being broken away. Fig. 2 is a view in side elevation of the mechanism in Fig. 1 with certain parts broken away; and Fig. 3, a view in elevation, partly sectional, of the lower end of the mechanism shown in Fig. 2.

4 represents a plate which in practice would be supported either from the standard (not shown) of the scale where the scale is of the platform type, in accordance with common practice, or from a suspension member where the scale is of the suspension type, this plate being formed with a boss 5 preferably cylindrical and projecting forwardly therefrom. In this boss a shaft 6 is shown to be journaled, this shaft being equipped at its outer end with a pinion 7 meshing with a vertically movable rack 8 formed as a continuation of a rod hereinafter referred to.

Extending at the portion thereof intermediate its ends, over the boss 5, is a flexible member 9 in the form of a band which, as also with the bands hereinafter referred to, should be of a material relatively non-stretchable under the weight of the objects which it is intended be weighed on the scale, and while any suitable material may be employed, it is preferred that the bands be made of shim-steel which is relatively inelastic and which may be provided of a thickness of about three one-thousandths inches and about an inch wide. The band 9 at its ends extends part way around, and is securely fastened to, rollers 10 each having a radially extending arm 11. The rollers 10 are secured to the ends of a band 12 which extends part way around the circumferences of these rollers, this band being interposed between the rollers and the band 9, and preferably arranged as shown in Fig. 1, the rollers 10 by preference having the bands 9 and 12 firmly secured thereto by securing the ends of these bands in overlapped relation in grooves 13 in the rollers 10. The portion of the band 12 intermediate its ends extends downwardly between the rollers 10 and is looped at its lower end, as indicated at 14, at which portion it engages a roller 15, this roller extending through the looped portion 14. The roller 15 is mounted on a shaft 16 journaled at its ends in the upper ends of the vertically extending rods 17 spaced apart and arranged in parallel relation, the lower ends of these rods being connected with the upper end of a cylinder 18 through the medium of stub-shafts 19 thereon, the rack bar 8 being formed as a continuation of one of the rods 17, whereby when the cylinder 18 lowers or raises, this rack bar will have a corresponding movement and through the medium of the pinion 7 rotating the shaft 6 and consequently the pointer 20 thereon which is adapted to move across, and coöperate with, a dial 21, the graduations of which representing pounds being uniform throughout the extent of the dial which extends throughout 360° and in the particular arrangement shown weighs up to 300 pounds. The lower end of the cylinder 18 connects with a rod 22 which in practice would be operatively connected with the weighing platform of a platform scale or a scale-pan of a suspension scale.

The lower extremities of the arms 11 are connected with the ends of a band 23, one end of which may be fixed to one arm as represented at 24 and the other preferably adjustably connected with the other arm as through the medium of an adjustable block 25 which directly connects with this end of the band 23 and engages at an elongated slot 26 in this block, with a screw 27 screwing into the arm 11, this block therefore being adjustable along the arm 11 carrying it, for lengthening and shortening the portion of the band 23 extending between the points of its engagement with the extremities of the arms 11. The band 23 at the portion just referred to is looped as shown and engages with a roller 28 which extends through this looped portion as shown, this roller being provided with a shaft 29 at which it is journaled in a yoke 30 carried on the upper end of a rod 31 formed with a disk 32 adapted to form a seat for weights 33. The lower end of the rod 31 is provided with a piston 34 which extends loosely into the cylinder 18.

It will be understood from the foregoing that the lowering of the rod 22, cylinder 18, rods 17, and roller 15, and consequently the pulling down on the band 12 which in lowering rotates the right-hand roller in anticlockwise direction and the left-hand roller in the opposite direction, is in opposition to the weight of the parts operatively connected with the rollers 10 and eccentrically disposed thereto, or in other words when weight is applied to the scale which acts to lower rod 22 and the parts connected therewith, the rollers 10 are rotated as stated, the arms 11 swinging outwardly and in such movement lifting the parts referred to suspended from the looped portion of the band 23.

By constructing a scale in accordance with my invention, the pointer 20 may be caused to substantially accurately indicate the weight of any object placed on the platform, within the weighing limits of the scale, and this, it will be noted, is accomplished with a uniformly-graduated dial and without the use of a compensating cam or the like, this being effected by making the looped portion of the band 23 of the requisite length and the parts suspended from this loop of the requisite weight, the length and weight referred to being dependent upon the conditions presented, as for example the number of pounds the scale is to weigh, the weight and length of the parts eccentrically disposed on the rollers 10, and the dead weight of the parts supported by the bands 12, and this may be determined if desired by actual test of the scale with different weights, the operator lengthening or shortening the band 23 at its connection through the block 25 with one of the arms 11 and applying or removing weights 38 from the disk 32 as conditions may require, until the length of the band 23 and the weight it supports are such that the movement of the pointer 20 under weight imposed by the action of weight imposed on the scale, will be directly proportional to the weight of the object, therefore indicating by the uniformly-graduated dial 21, the accurate weight of the article.

The cylinder 18 preferably contains oil in which the piston 34 reciprocates, whereby this mechanism operates to return to normal position (Fig. 1) without objectionable jerking, when the weight is removed from the scale.

While I have illustrated and described a particular construction of scale mechanism embodying my invention, I do not wish to be understood as intending to limit it thereto, as the same may be variously modified and altered without departing from the spirit of my invention, it being my intention to claim my invention as fully and completely as the prior state of the art will permit.

What I claim as new and desire to secure by Letters Patent is:

1. In a weighing mechanism, the combination of a member adapted to be shifted by the application of weight thereto, a pair of oscillable members, a depending element engaging said oscillable members at points eccentric of the axes of said oscillable members and tending to move the latter, and means for actuating said oscillable members from said first-named member in opposition to said element, the parts being so constructed and arranged that in the actuation of said oscillable members from said means, the points of engagement between said oscillable members and said element move away from each other in an upward direction from positions below the axes of said oscillable members.

2. In a weighing mechanism, the combination of a member adapted to be shifted by the application of weight thereto, a pair of oscillable members, a weight, connections between said weight and said oscillable members, said connections being flexibly connected with said oscillable members eccentrically of the axes of the latter, and means for actuating said oscillable members from said first-named member, the parts being so constructed and arranged that in the movement of said oscillable members from said means, the points of engagement between said oscillable members and said connections move away from each other in an upward direction from positions below the axes of said oscillable members.

3. In a weighing mechanism, the combination of a member adapted to be shifted by the application of weight thereto, a pair of oscillable members having arms radiating therefrom, a weight, connections between said weight and said arms, said connections being flexibly connected with said arms, and means for actuating said oscillable members from said first-named member, the parts being so constructed and arranged that in the movement of said oscillable members from said means, the points of engagement between said oscillable members and said connections move away from each other in an upward direction from positions below the axes of said oscillable members.

4. In a weighing mechanism, the combination of a member adapted to be shifted by the application of weight thereto, a pair of oscillable members, a band connected at its ends with said oscillable members eccentrically of the axes of the latter, a weight supported from said band between the ends of the latter, and means for actuating said oscillable members from said first-named member, the parts being so constructed and arranged that in the actuation of said oscillable members from said means, the points of engagement between said oscillable members and said band move away from each other in an upward direction from positions below the axes of said oscillable members.

5. In a weighing mechanism, the combination of a member adapted to be shifted by the application of weight thereto, a pair of oscillable members having arms radiating therefrom, a band connected at its ends with said oscillable members eccentrically of the axes of the latter, a weight supported from said band between the ends of the latter, and means for actuating said oscillable members from said first-named member, the parts being so constructed and arranged that in the actuation of said oscillable members from said means, the points of engagement between said arms and said band move away from each other in an upward direction from positions below the axes of said oscillable members.

6. In a weighing mechanism, the combination of a member adapted to be shifted by the application of weight thereto, a pair of oscillable members, a band connected at its ends with said oscillable members eccentrically of the axes of the latter, a weight supported from said band between the ends of the latter and formed with a cross-member lying across, and supported by, the lower portion of said band, and means for actuating said oscillable members from said first-named member, the parts being so constructed and arranged that in the actuation of said oscillable members from said means, the points of engagement between said oscillable members and said band move away from each other in an upward direction from positions below the axes of said oscillable members.

7. In a weighing mechanism, the combination of a member adapted to be shifted by the application of weight thereto, a pair of oscillable members having arms radiating therefrom, a band connected at its ends with said arms, a weight formed with a cross member lying across, and supported by, the lower portion of said band, and means for actuating said oscillable members from said first-named member, the parts being so constructed and arranged that in the actuation of said oscillable members from said means, the points of engagement between said oscillable members and said element move away from each other in an upward direction from positions below the axes of said oscillable members.

8. In a weighing mechanism, the combination of a member adapted to be shifted by the application of weight thereto, a pair of oscillable members, a weight, connections between said weight and said oscillable members, said connections being flexibly connected with said oscillable members eccentrically of the axes of the latter, and a band-connection between said first-named member and said oscillable members engaging the peripheries of said oscillable members and through the medium of which weight applied to said first-named member actuates said oscillable members in opposition to said weight, the parts being so constructed and arranged that in the actuation of said oscillable members from said band connection, the points of engagement between said oscillable members and said connections move away from each other in an upward direction from positions below the axes of said oscillable members.

9. In a weighing mechanism, the combination of a member adapted to be shifted by the application of weight thereto, a pair of oscillable members, a band connected at its ends with said oscillable members eccentrically of the axes of the latter, a weight supported from said band between the ends of the latter, and a band connection between said first-named member and said oscillable members engaging the peripheries of said oscillable members in opposition to said weight, the parts being so constructed and arranged that in the actuation of said oscillable members from said first-named member, the points of connection between said oscillable members and said band move away from each other in an upward direction from positions below the axes of said oscillable members.

10. In a weighing scale the combination of a member adapted to be shifted by the application of weight thereto, a pair of oscillable members having arms radiating therefrom, a depending element engaging said arms at points eccentric of the axes of said oscillable members and tending to move the latter in one direction, and means for actuating said oscillable members from said first-named member to swing said arms outwardly, the parts being so constructed and arranged that in the actuation of said oscillable members from said means, the points of engagement between said arms and said element move away from each other in an upward direction from positions below the axes of said oscillable members.

11. In a weighing scale, the combination of a member adapted to be shifted by the application of weight thereto, a pair of oscillable members having arms radiating therefrom, a band engaging at its ends said arms eccentrically of the axes of the latter, means supported from said band between the ends of the latter and tending to move said oscillable members, and means for actuating said oscillable members from said first-named member to swing said arms outwardly, the parts being so constructed and arranged that in the actuation of said oscillable members from said means, the points of engagement between said arms and said band move away from each other in an upward direction from positions below the axes of said oscillable members.

12. In a weighing mechanism, the combination of a member adapted to be shifted by the application of weight thereto, a pair of oscillable members, a weight, connections between said weight and said oscillable members, said connections being flexibly connected with said oscillable members eccentrically of the axes of the latter, and bands engaging the peripheries of said oscillable members supporting the latter in floating condition and supporting said first-named member from said oscillable members.

13. In a weighing mechanism, the combination of a member adapted to be shifted by the application of weight to the mechanism, a pair of oscillable members having arms radiating therefrom, a weight, connections between said weight and said arms, said connections being flexibly connected with said arms, and bands engaging the peripheries of said oscillable members supporting the latter in floating condition and supporting said first-named member from said oscillable members.

14. In a weighing mechanism, the combination of a member adapted to be shifted by the application of weight thereto, a pair of oscillable members, a band connected at its ends with said oscillable members, eccentrically of the axes of the latter, a weight supported from said band between the ends of the latter, and bands engaging the peripheries of said oscillable members supporting the latter in floating condition and supporting said first-named member from said oscillable members.

15. In a weighing mechanism, the combination of a member adapted to be shifted by the application of weight thereto, a pair of oscillable members, a weight, connections between said weight and said oscillable members, said connections being flexibly connected with said oscillable members eccentrically of the axes of the latter, band-means engaging the peripheries of said oscillable members and supporting the latter in floating condition, and band-means engaging the peripheries of said oscillable members and extending downwardly between the latter and in engagement therewith and connected at their lower portions with said first-named member.

16. In a weighing mechanism, the combination of a member adapted to be shifted by the application of weight thereto, a pair of oscillable members, a weight, connections between said weight and said oscillable members, said connections being flexibly connected with said oscillable members eccentrically of the axes of the latter, band-means engaging the peripheries of said oscillable members and supporting the latter in floating condition, band-means engaging the peripheries of said oscillable members and extending downwardly between the latter and in engagement therewith, and means connecting said last-named band-means with said first-named member including a cross-piece on said first-named member extending across, and supported from, said last-named band-means, intermediate the ends of the latter.

17. In a weighing mechanism, the combination of a member adapted to be shifted by the application of weight thereto, a pair of oscillable members, a weight, connections between said weight and said oscillable members, said connections being flexibly connected with said oscillable members eccentrically of the axes of the latter, means for rotating said oscillable members from said first-named member, and means for cushioning the movement to normal position, of the parts actuated through said oscillable members comprising a cylinder containing a liquid and a plunger connected with the parts actuated through said oscillable members and operating in said cylinder.

18. In a weighing mechanism, the combination of a member adapted to be shifted by the application of weight thereto, a pair of oscillable members, a weight, connections between said weight and said oscillable members, said connections being flexibly connected with said oscillable members eccentrically of the axes of the latter, means for rotating said oscillable members from said first-named member, and means for cushioning the movement to normal position, of the parts actuated through said oscillable members comprising a cylinder forming a section of said first-named member and containing a liquid and a plunger connected with the parts actuated through said oscillable members and operating in said cylinder.

MORTIMER B. MILLS.